US009465987B1

(12) United States Patent
Bell et al.

(10) Patent No.: US 9,465,987 B1
(45) Date of Patent: Oct. 11, 2016

(54) MONITORING AND DETECTING WEATHER CONDITIONS BASED ON IMAGES ACQUIRED FROM IMAGE SENSOR ABOARD MOBILE PLATFORMS

(71) Applicant: Exelis Inc., McLean, VA (US)

(72) Inventors: Brian Bell, Boulder, CO (US); Eric Dixon, Herndon, VA (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 14/660,510

(22) Filed: Mar. 17, 2015

(51) Int. Cl.
G06K 9/00 (2006.01)
G06K 9/52 (2006.01)
G06K 9/62 (2006.01)
H04N 7/18 (2006.01)

(52) U.S. Cl.
CPC ............ G06K 9/00476 (2013.01); G06K 9/52 (2013.01); G06K 9/6267 (2013.01); H04N 7/183 (2013.01)

(58) Field of Classification Search
None
See application file for complete search history.

(56) References Cited

U.S. PATENT DOCUMENTS

| 8,275,522 | B1* | 9/2012 | Groeneweg | G06Q 10/06 701/50 |
|---|---|---|---|---|
| 8,436,902 | B2* | 5/2013 | Kuehnle | G01W 1/14 348/142 |
| 8,630,784 | B2 | 1/2014 | Bai | |
| 2004/0138831 | A1* | 7/2004 | Watanabe | B60T 8/1725 702/33 |
| 2005/0240378 | A1 | 10/2005 | Smith et al. | |
| 2008/0030370 | A1 | 2/2008 | Doyle | |
| 2008/0140318 | A1 | 6/2008 | Breed | |
| 2009/0208106 | A1* | 8/2009 | Dunlop | G06K 9/00664 382/173 |
| 2010/0250106 | A1 | 9/2010 | Bai et al. | |
| 2014/0233805 | A1* | 8/2014 | Faber | G01W 1/00 382/104 |
| 2015/0054954 | A1* | 2/2015 | Itoh | B60R 11/04 348/148 |
| 2015/0109450 | A1* | 4/2015 | Walker | H04N 5/77 348/148 |
| 2015/0145995 | A1* | 5/2015 | Shahraray | H04N 7/181 348/148 |
| 2015/0166072 | A1* | 6/2015 | Powers | B60W 40/06 701/1 |
| 2015/0334385 | A1* | 11/2015 | Takemura | H04N 17/002 348/175 |
| 2016/0001780 | A1* | 1/2016 | Lee | G06K 9/00791 701/48 |
| 2016/0009218 | A1* | 1/2016 | Nakashima | B60Q 1/20 701/36 |
| 2016/0026865 | A1* | 1/2016 | Reynolds, Jr. | G06T 7/0075 382/103 |

FOREIGN PATENT DOCUMENTS

| DE | 102012004998 A1 | 7/2013 |
|---|---|---|
| EP | 1566665 A1 | 8/2005 |
| WO | 2012062764 A1 | 5/2012 |

OTHER PUBLICATIONS

Bossu et al., "Rain or snow detection in image sequences through use of histogram of orientation of streaks", Int J Comput Vis (2011) 93: 348-367.*

* cited by examiner

Primary Examiner — Soo Park
(74) Attorney, Agent, or Firm — Edell, Shapiro & Finnan LLC

(57) ABSTRACT

A weather control station receives from a communication network data packets transmitted wirelessly to the network by a mobile platform separated from the control station. The data packets carry images captured by an image sensor aboard the mobile platform and show one or more weather conditions local to the mobile platform. The control station recovers the images from the data packets and processes the recovered images according to one or more weather condition detection algorithms to detect the one or more weather conditions, respectively. The weather station reports the one or more detected weather conditions.

21 Claims, 9 Drawing Sheets

MONITORING AND DETECTING WEATHER CONDITIONS BASED ON IMAGES ACQUIRED FROM IMAGE SENSOR ABOARD MOBILE PLATFORMS

TECHNICAL FIELD

The present disclosure relates to monitoring and detecting weather conditions based on images captured by image sensors aboard mobile platforms.

BACKGROUND

Weather forecasters use a mix of radar, satellite, forecast models, and observational data to forecast weather. Historically, weather observation networks have focused on atmospheric conditions and may ignore areas below the horizon where people live and drive vehicles. Weather data acquired or collected by the historical observation networks is primarily tailored to atmospheric-based observation rather than ground-based observation. Based on such atmospheric-based weather data, forecasters can predict specific atmospheric conditions which are consistent with a specific weather event, but unfortunately cannot verify that the event is actually taking place or will take place on or near the ground in localized population centers. Instead, confirmation is left to haphazard ground-based reports from local storm-chasers and the like to confirm the weather event by visual means. Thus, forecasters remain limited in their ability to provide long-lead forecasts for localized, small-scale, and high impact phenomena, such as individual thunderstorm cells, the location of the divide between rain and snow during major storms, flash floods, and fine-scale, short-lived variations in solar radiation and low-level winds.

DESCRIPTION OF EXAMPLE EMBODIMENTS

Overview

A weather control station receives from a communication network data packets transmitted wirelessly to the network by a mobile platform separated from the control station. The data packets carry images captured by an image sensor aboard the mobile platform and show one or more weather conditions local to the mobile platform. The control station recovers the images from the data packets and processes the recovered images according to one or more weather condition detection algorithms to detect the one or more weather conditions, respectively. The weather station reports the one or more detected weather conditions.

In an embodiment using a network of mobile platforms, each of the mobile platforms is respectively equipped with an image sensor to capture images that show weather conditions local to the mobile platform, a mobile platform processor to packetize the images into data packets, and a wireless transmitter to wirelessly transmit the data packets to a communication network. A control station receives from the communication network the data packets transmitted thereto by the mobile platforms, recovers from the data packets the images from each of the image sensors and process the images according to one or more weather condition detection algorithms to detect the one or more weather conditions local to each of the mobile platforms, respectively. The control station generates for display the images from each mobile platform and corresponding reports of detected weather conditions output by the weather condition detection algorithms.

Example Embodiments

Figure 1:
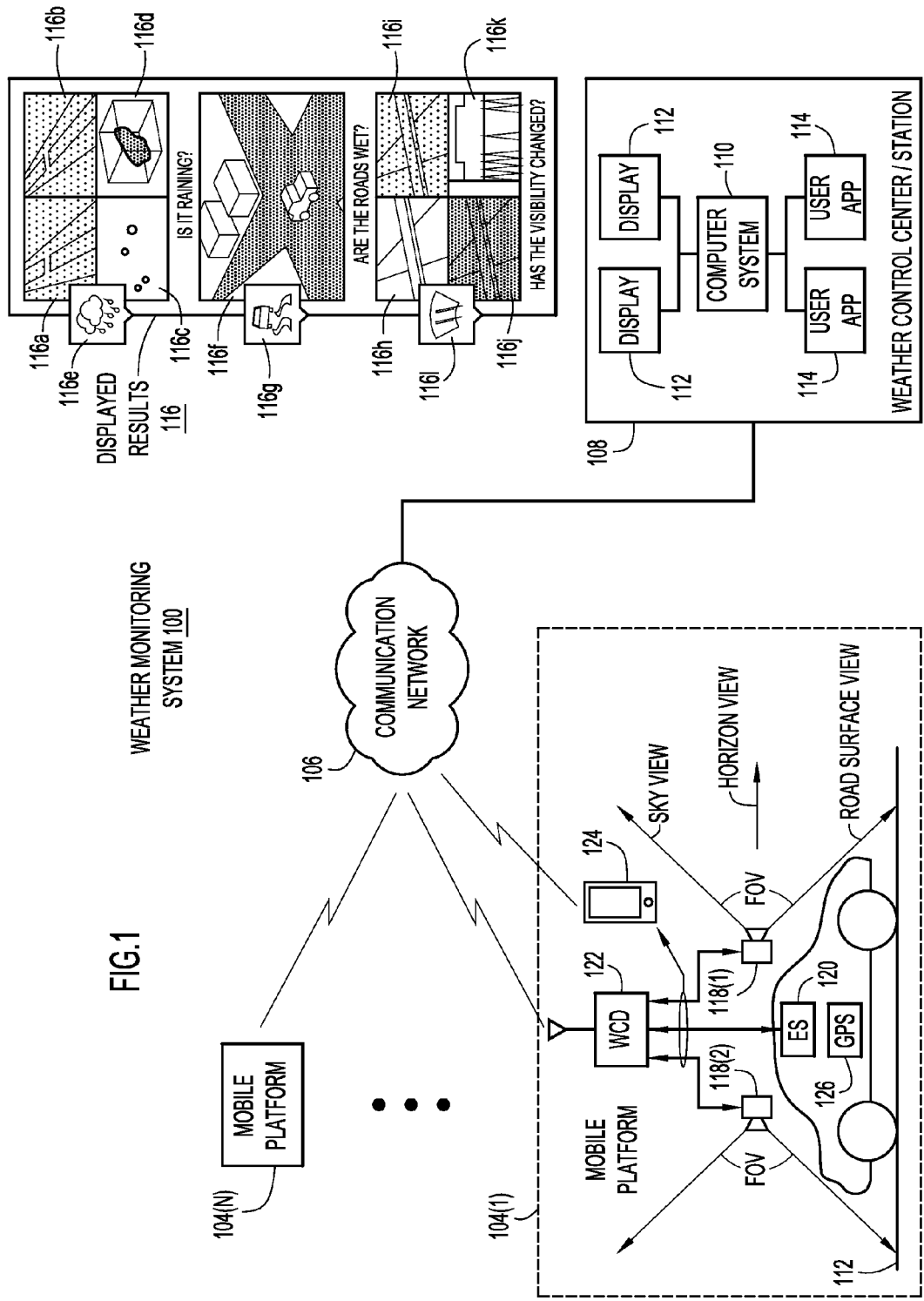
FIG. 1 is a block diagram of an example weather monitoring system in which localized weather conditions may be monitored and detected based on images or videos acquired by mobile platforms.

With reference to FIG. 1, there is shown a block diagram of an example weather monitoring system 100 in which geographically distributed localized weather conditions may be monitored and detected based on images or video (i.e., a sequences of images) acquired by image sensors aboard mobile platforms that roam across the different geographical areas. System 100 includes multiple mobile platforms 104(1)-104(N) each equipped to capture images that show or indicate local weather conditions, i.e., weather conditions in a vicinity of the corresponding mobile platform, and wirelessly transmit the images in data packets to a communication network 106. Communication network 106 may include one or more wide area networks (WANs), such as the Internet, and one or more local areal networks (LANs).

Environment 100 also includes a central weather control center or station 108 to receive from communication network 106 the images transmitted by mobile platforms 104. Station 108 includes a computer system 110, such as one or more servers, to process the received images in order to detect specific local weather conditions indicated in the received images. Station 108 also includes displays 112 to display results of the weather condition detections and the received images. Computer 110 stores and then disseminates the received images, processing/weather condition detection results, and other weather reports to user applications (e.g., computer programs) 114 and/or back to mobile platforms 104 via communication network 106. Thus, station 110 collects, detects, stores and disseminates various data related to weather conditions and forecasts local to each of mobile platforms 104.

Example screen shots of images from mobile platforms 104 and weather condition detection results associated with the images displayed on displays 112 are depicted at 116 in FIG. 1. In the example, screen shots 116a and 116b represent images captured by cameras 118 on vehicle 104(a), screen shots 116c and 116d represent analytical weather condition detection results, and rain icon 116e represents a visual weather condition detection report to indicate rain associated with the images has been detected. Screen shot 116f represents an image captured by a camera aboard another of vehicles 104, and road surface wetness icon 116g (a) represents a visual weather condition detection report to indicate road surface wetness associated with the image has been detected. Example screen shots 116h-116j represent images from a vehicle that show changes in weather-related visibility, screen shot 116k represents analytical weather condition detection results, and visibility change icon 116k represents a visual weather condition detection report to indicate the visibility changes.

Mobile platforms 104 may include land-based vehicles such as cars, trucks, trains, and the like. Mobile platforms 104 may also include boats and low-flying airborne vehicles, such as unmanned aerial vehicles (UAVs) and airplanes. Mobile platforms 104 have similar capabilities to one another with respect to capturing images, optionally processing the images, and transmitting the images to communication network 106. Therefore, the following description of mobile platform 104(1) shall suffice for the other mobile platforms.

In the example of FIG. 1, mobile platform 104(1) is depicted as a land-based vehicle such as a car or truck that travels on a road 112. Components carried on-board vehicle 104(1) are depicted inside an expanded-view box with a dashed outline. Vehicle 104(1) carries cameras 118(1) and 118(2), e.g., video cameras, mounted to front and rear portions of vehicle 104 and configured with respective field-of-views (FOVs) facing forward and rearward to capture scenes of weather conditions within the FOVs. In the example of FIG. 1, the FOVs of cameras 118(1) and 118(2) encompass scenes that include a surface of road 112 on which vehicle 104(1) travels, the horizon toward or away from which the vehicle travels, and at least a portion of the sky. Vehicle 104(1) may include more or less cameras that are depicted in the example of FIG. 1. Vehicle 104(1) may also carry a set of one or more environmental sensors (ES) 120 to sense atmospheric pressure, temperature, humidity, and/or wind speed, for example.

Vehicle 104(1) may also include an on-board wireless communication device (WCD) 122 that communicates with (i) cameras 118 and sensors 120 over wired and/or wireless communication links aboard vehicle 104(1), and (ii) communication network 106 over a wireless network link. WCD 122 receives video of local weather conditions captured by cameras 118 and sensor measurements from sensors 122, and also sends control commands to the cameras and sensors via the communication links aboard vehicle 104(1). WCD 122 wirelessly transmits the received video and sensor measurements to communication network 106 destined for station 110 via the wireless network link.

In an embodiment, vehicle 104(1) may also carry a hand-held camera-equipped WCD 124, such as a mobile/smart phone, laptop personal computer (PC), or tablet, which operates as a wireless relay link to relay information from cameras 118 and environmental sensors 120 to communication network 106. In addition, hand-held WCD 124 may capture its own images or videos of weather conditions in the vicinity of vehicle 104(1) under operation of a user and transmit that information to communication network 106.

Vehicle 104(1) may also carry a Global Positioning System (GPS) device 126 that provides position-related information for the vehicle. The position-related information may be provided to WCD 122 for wirelessly transmission thereby along with the images and sensor measurement or the position-related information may be wirelessly transmitted directly from GPS device 126.

Cameras 118, WCD 124, and other devices capable of capturing or acquiring images are referred to herein more generally as "image sensors," "image devices," "imaging devices/sensors," or "imagers" that capture or acquire images of a scene. The image sensors may be configured to capture images in a visible light spectrum or an infrared spectrum. Either visible light or infrared images may be processed in accordance with the weather condition detection algorithms described below. Cameras 118 may be digital cameras having pan, tilt, and zoom (PTZ) features that may be implemented and controlled mechanically and/or digitally.

Figure 2:
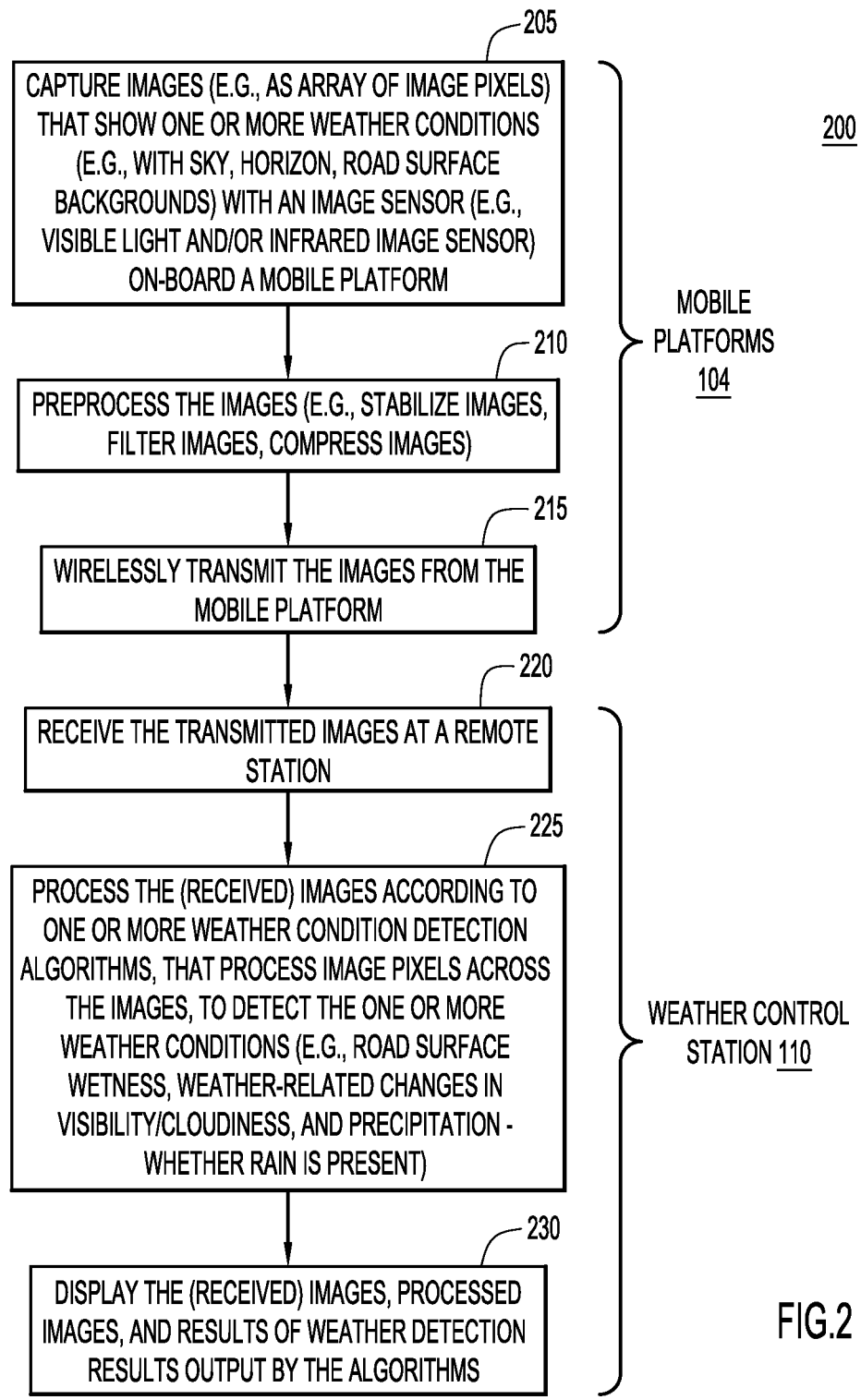
FIG. 2 is a flowchart of an example method of monitoring and detecting weather conditions based on images or video captured by one or more of the mobile platforms of FIG. 1.

With reference to FIG. 2, there is a flowchart of an example method 200 of monitoring and detecting weather conditions based on images or video captured by one or more of mobile platforms 104, e.g., mobile platform 104(1). Method 300 is described in connection with system 100 by way of example.

At 205, image sensors, e.g., cameras 118 aboard vehicle 104(1) each capture images or videos of scenes within their respective FOVs that show one or more weather conditions local to vehicle 104(1), and provide the captured images or videos to WCD 122. The image sensors capture some of the images while vehicle 104(1) is not in motion and some of the images while the vehicle is in motion. In the example of FIG. 1, cameras 118 capture images of scenes that include portions of the sky, the horizon, and the road surface. The captured images may include visible light and/or infrared images. The captured images each include an array of image pixels, where each pixel includes one or more pixel intensity values. For example, in color images, each color pixel may include Red, Green, and Blue (RGB) intensity values. Alternatively, black-and-white images may include only grey scale pixel intensity values. Also at 205, environmental sensors 120 sense atmospheric pressure, temperature, humidity, and dew point, for example, and provide their measurements to WCD 122.

At 210, WCD 122 optionally pre-processes the images from the image sensors. For example, WCD 122 may perform image stabilization on the images according to any known or hereafter developed image stabilization technique to compensate for scene motion introduced by motion of mobile platform 104(1). Also, WCD 122 may filter the images to remove images that may be unsuitable for subsequent processing in one or more weather condition detection algorithms. For example, WCD 122 may remove images that have overall intensities that are either too dark or too light for the algorithms. To do this, WCD 122 may calculate an average pixel intensity value across the array of pixels in a captured image, compare the average pixel intensity against a predetermined acceptable range of average pixel intensities suitable for the algorithms, and remove the captured image if the average pixel intensity does not fall within the acceptable range. Such filtering may be referred to as "image triage" to determine which of the images are suitable for further processing. WCD 122 may also compress the images in preparation for wireless transmission to communication network 106. Any known or hereafter developed image compression technique may be used to compress the images.

At 215, WCD 122 packetizes the images, or the preprocessed images, from cameras 118 into data packets suitable for transmission to and across communication network 106. The data packets may also include the sensor measurements reported by sensors 120. WCD 122 may add mobile platform identifier (ID) information into the data packets to associate each data packet (and thus the images and/or environmental sensor measurements therein) with the mobile platform that captured the information in the data packet. WCD 122 wirelessly transmits the data packets including the images (which may be in a preprocessed, e.g., stabilized, compressed, form) and the sensor measurements to communication network 106 in accordance with any known or hereafter developed wireless protocol. The data packets may be formatted to include communication protocol information such as, but not limited to, Internet Protocol (IP) addresses associated with destination station 110. In a known manner, communication network 106 routes the data packets transmitted thereto to station 110 based on the communication protocol information.

In an embodiment, WCD 124 may also capture images of local weather conditions and transmit the images to communication network 106. Also, cameras 118 may provide their images to WCD 124 instead of WCD 122 so that WCD 124 can relay the images to communication network 106.

At 220, station 110 receives the data packets from communication network 106 and initially processes the data packets to recover the images and sensor measurements therein, and stores the recovered information (e.g., images and sensor measurements). Such initial processing may include image decompression of the received images, as necessary, and tagging of the recovered images and environmental sensor measurements with mobile platform IDs recovered from the data packets that identify the source, e.g., the mobile platform from which the images and sensor measurements were received. At 220, station 110 may also receive position-related information for a given mobile platform (e.g., mobile platform 104(1)) from a GPS device on the platform (e.g., GPS device 126).

At 225, computer system 110 processes the (received) images from each of mobile platforms 104 (e.g., mobile platform 104(1)) according to one or more weather condition detection algorithms to detect one or more weather conditions represented by, or shown in, the images from the mobile platform. For example, computer system 110 may process the images in accordance with all, or one or more selected ones of, a road-surface wetness detection algorithm to detect road surface wetness, a visibility-change detection algorithm to detect weather-related changes in visibility/cloudiness, and a precipitation detection algorithm to detect precipitation, e.g., whether rain or snow is present. Each of the weather condition detection algorithms processes or operates on the image pixels of the images to generate results indicative of the pertinent weather condition. Different weather condition algorithms are described below in connection with FIGS. 5-7; however, other weather condition detection algorithms that operate on the images to detect weather conditions may be used, as would be appreciated by one having ordinary skill in the relevant arts with access to the present application.

In an embodiment, the weather condition detection algorithms mentioned above detect weather conditions based on images from a given mobile platform (e.g., mobile platform 104(1)) without using any environmental sensor measurements received from the mobile platform, such as atmospheric pressure, temperature, humidity, and dew point measurements. In another embodiment, computer system 110 may also processes the environmental sensor measurements received from a given mobile platform to detect local weather conditions based on the environmental sensor measurements. In yet another embodiment, computer system 110 may process the images according to the above-mentioned weather condition detection algorithms and combine the results output by the algorithms with the environmental sensor measurements to verify the results. Even further embodiments synthesize more complex weather condition detection algorithms that operate on both the images and sensor measurements in combination to detect weather conditions.

At 230, computer system 110 generates for display the recovered images and also results of the weather condition detection algorithms, e.g., reports of whether the road surface is wet or dry, whether it is raining, and whether weather-related conditions have caused a change in visibility. Computer system 110 may also generate for display a location of the mobile platform associated with images based on location-related information (e.g., from a GPS device) about the mobile platform. Displays 112 display the images and reported results so that they may be viewed and interpreted by service personnel/users at station 110. Example screen shots that show results output by the weather condition detection algorithms and the received images are depicted at 116 in FIG. 1. Computer system 110 may also provide the recovered images and weather condition detection results (i.e., results indicative of the detected weather conditions) to each of user applications 114, e.g., local and national weather forecasting applications, for use thereby.

Operations 205-230 apply across multiple ones of mobile platforms 104. For example, multiple ones of mobile platforms 104 may concurrently perform operations 205-215 to capture images of their local weather conditions, optionally preprocess their respective captured images, and wirelessly transmit their respective images to communication network 106. In response, at operations 220-230, station 110 receives the images transmitted from the multiple mobile platforms, processes the received/recovered images from each of the multiple ones of mobile platforms 104 in accordance with multiple corresponding instances of the weather condition detection algorithms, and displays the images of local weather conditions from each of the mobile platforms and the results output by the corresponding weather condition detection algorithms for each of the mobile platforms. Such displays enable the control station personnel to visualize weather conditions local to, i.e., in the vicinity of, each of the different mobile platforms. In an embodiment, computer system 110 may "video stitch" together images received from multiple cameras aboard a given vehicle, or images received from multiple vehicles traveling within the same local area, and then generate for display the video stitched scene. When displayed, the video stitched scene represents a panoramic, wider view of the local area. Any known or hereafter developed video stitching technique may be used to combine images from different image sensor into a larger scene.

In the embodiment depicted in FIG. 2, weather condition detection algorithms to detect weather conditions based on image processing are implemented at control station 110. In another embodiment, the weather condition detection algorithms to detect weather conditions based on image processing may be implemented at the mobile platforms, e.g., in WCD 122, in which case weather condition detection results may be wireless transmitted from the mobile platforms to control station 110 for presentation to weather station personnel.

Figure 3:
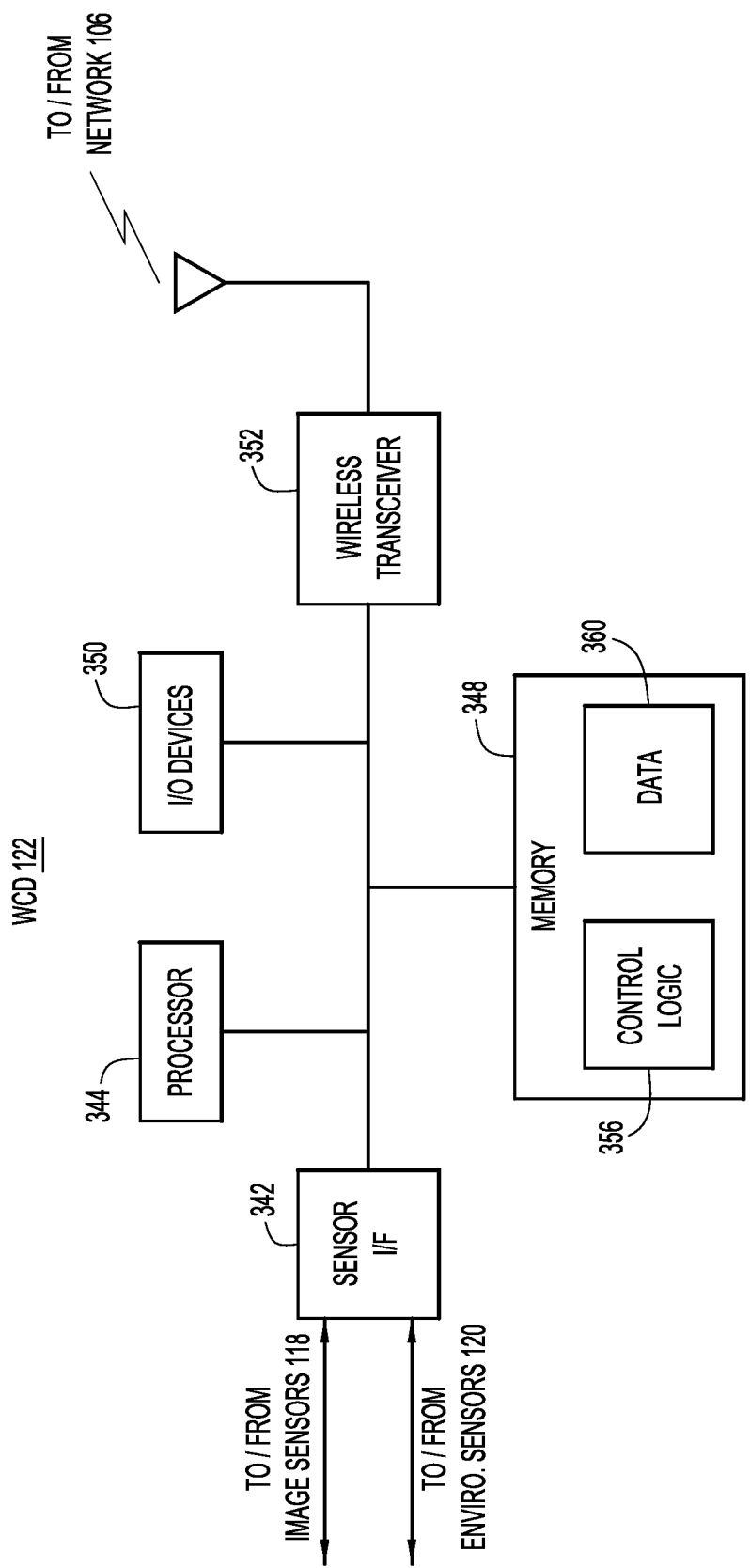
FIG. 3 is an example block diagram of a wireless communication device (WCD) carried on a mobile platform of the system of FIG. 1.

With reference to FIG. 3, there is an example block diagram of wireless communication device (WCD) 122 configured to perform operations described herein. There are numerous possible configurations for WCD 122 and FIG. 3 is meant to be an example. WCD 122 includes a sensor interface (I/F) 342 to communicate with (e.g., receive sensed data from and provide control commands to) cameras 118 and environmental sensors 120 through wired or wireless links, a processor 344, memory 348, I/O devices 350, and a wireless transmitter/receiver (i.e., transceiver) 352 to communicate wirelessly with communication network 106. The processor 344 is a microcontroller or microprocessor, for example, configured to execute software instructions stored in the memory 348. I/O devices 350 include devices to accept input from and present information to a user. I/O devices 350 may include a display/monitor (which may be a touch sensitive display for accepting user input), a mouse, a keyboard, and the like.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for control logic 356 to perform generalized control of WCD 122 as well as preprocessing of images and packetizing of images and sensor measurements for wireless transmission, as described above. In addition, the memory 348 stores data 360 used and generated by control logic 356, including images and sensor measurements, preprocessed images, and camera settings.

Figure 4:
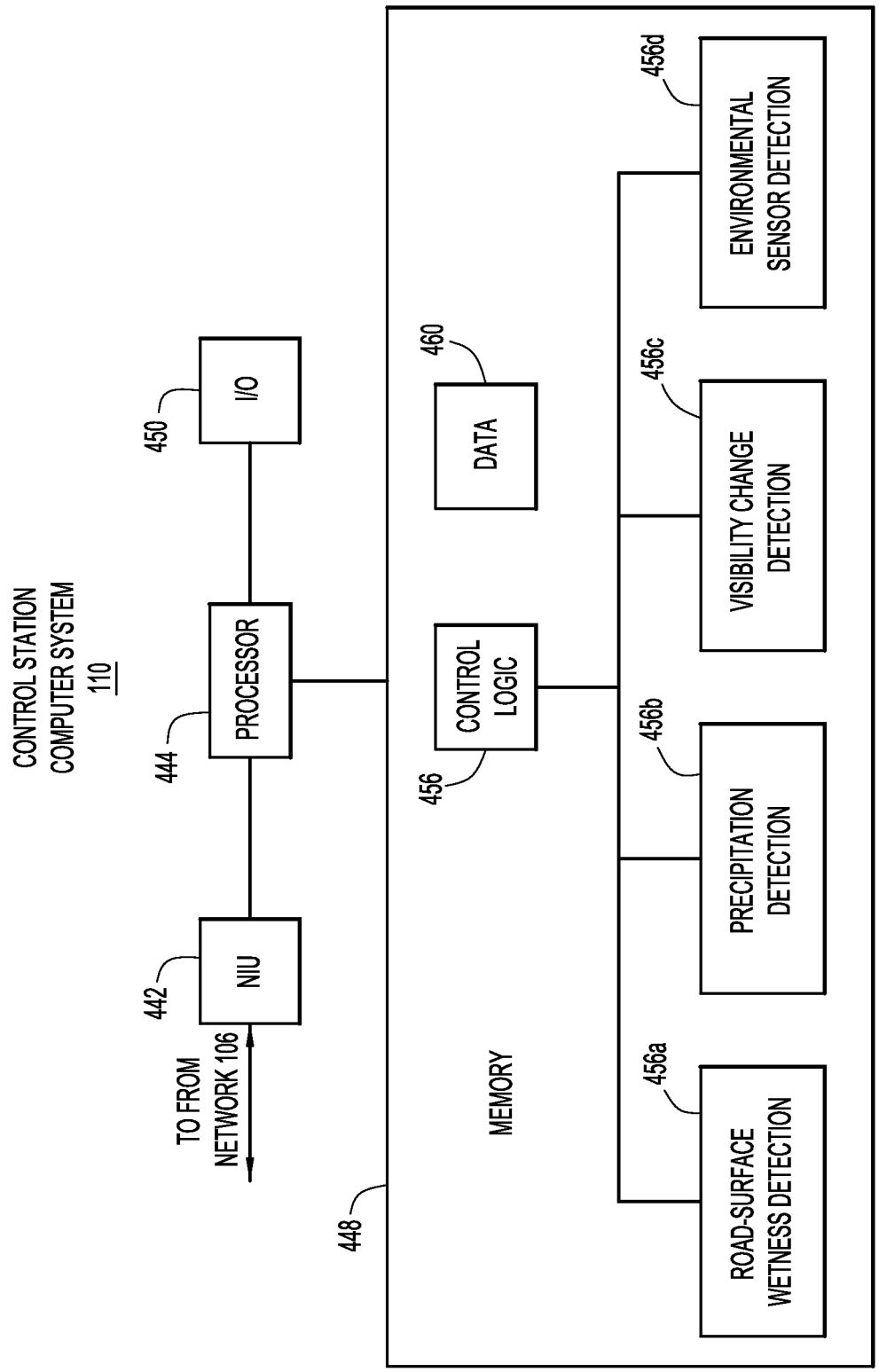
FIG. 4 is a block diagram of an example computer system or server of a control station of the system of FIG. 1.

With reference to FIG. 4, there is an example block diagram of computer system or server 110 of control station 108 configured to perform operations described herein. There are numerous possible configurations for computer system 110 and FIG. 4 is meant to be an example. Computer system 110 includes a network interface unit (NIU) 442 to communicate with communication network 106 through wired or wireless connections, a processor 444, memory 448, and an input/output (I/O) interface 450 to interface with I/O devices such as displays and user input devices. The processor 444 is a microcontroller or microprocessor, for example, configured to execute software instructions stored in the memory 448.

The memory 448 may be similar to memory 348 described above and may comprise one or more computer readable storage media (e.g., a memory device) encoded with software comprising computer executable instructions, and when the software is executed (by the processor 444) it is operable to perform the operations described herein. For example, the memory 448 stores or is encoded with instructions for control logic 456 to perform generalized control of control station 108, processing of images received from mobile devices 104 in accordance with weather condition detection algorithms to detect various weather conditions based on the images, and generating information for display on displays 112 (e.g., image representations and detection results). For example, control logic 456 may include road-surface wetness detection logic 456a to detect road surface wetness, precipitation detection logic 456b to detect precipitation, weather-related visibility-change detection logic 456c to detect changes in visibility, and environmental sensor logic 456d to detect weather conditions based on received environmental sensor measurements. In another embodiment, instances of weather condition detection logic/ algorithms may also be implemented on mobile of platforms 104 (e.g., stored in memory 348) to enable weather condition detection based on image processing to be performed on the mobile platforms. Memory 448 additionally stores (i) data 460 used/accessed and generated by control logic 456, including images recovered from data packets received from the mobile devices and associated with mobile device identifiers also stored in the memory, (ii) results produced by the weather condition detection algorithms, (iii) environmental sensor measurements received from the mobile devices, and (iv) mobile device position-related information.

As mentioned above, control logic 456 includes a suite of weather condition detection algorithms 456a-456d (also referred to herein as "image analytic software" as "weather prediction algorithms"). The weather condition detection algorithms comprise computer vision and machine learning algorithms that decompose camera imagery (i.e., images) into predictive features used to make assertions on the current state of weather, i.e., detect weather conditions. The weather condition detection algorithms include road-surface wetness detection (also referred to as road-surface wetness estimation), visibility-change detection, and precipitation detection. The weather condition detection algorithms run on sequences of images captured from the network of image sensors, e.g., cameras, aboard moving platforms 104. The imagery from these cameras may be low-resolution, highly compressed, and often requires preprocessing to condition them for analytical/algorithmic purposes. Preprocessing may include image stabilization and filtering as mentioned above, as well as other types of preprocessing.

The road-surface wetness detection algorithm performed by logic 456a is now described. Changes in road surface conditions, such as wet or dry states, often result in measureable changes in the appearance of the road (e.g., changes in texture, lightness, shininess, etc.). The road-surface wetness detection algorithm utilizes a multi-stage processing scheme consisting of scene normalization, image segmentation, feature extraction, and state estimation using machine learning algorithms. The scene normalization stage helps to standardize the camera exposures across the wide range of lighting conditions that exist throughout the day/season. Since the goal of the algorithm is to determine the wetness state of the road surface (i.e., wet or dry), the image is segmented to isolate the road surface from the rest of the world (e.g., sky, foliage, buildings, etc.). Statistical features of the road-surface regions are extracted using a filtering process. These feature extractors are designed to be responsive to the changes in appearance of the road surface with changes in wetness state.

In a final stage of the process, the extracted features are input into a machine-learning algorithm, such as a support vector machine or artificial neural network, which has been trained to recognize/discriminate between wet and dry features. Robust feature spaces and training sets are required that span the wide range of road types, road textures, and road orientations within the images. Many thousands of instances of features extracted from wet and dry roads to create robust classifiers may be used.

Figure 5:
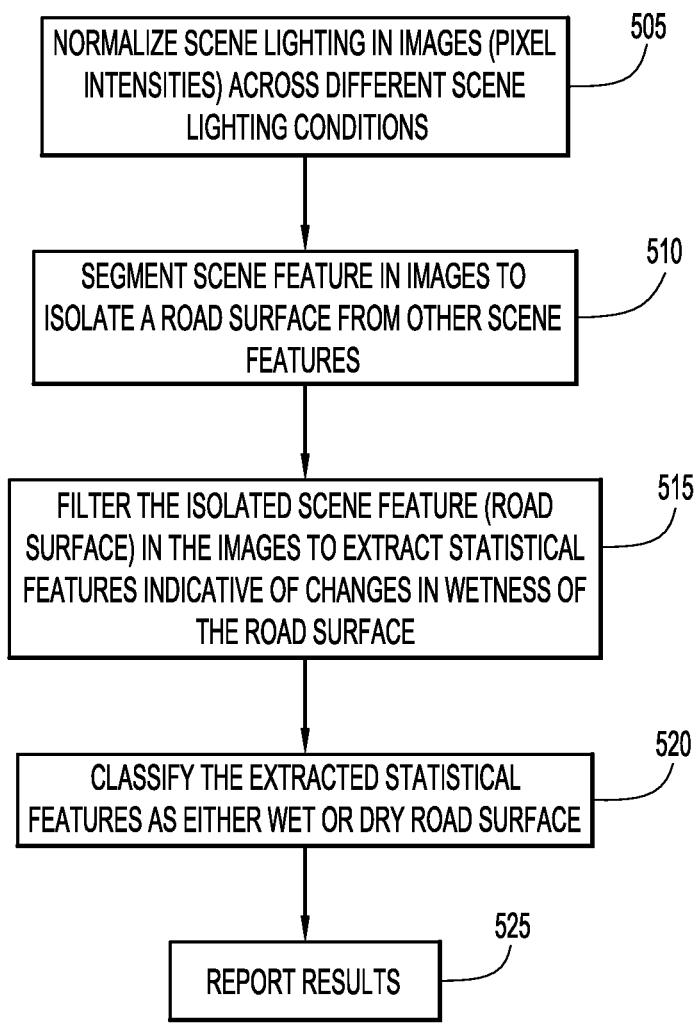
FIG. 5 is a flowchart of an example method of processing images captured by a mobile platform image sensor to detect road surface wetness.

With reference to FIG. 5, there is a flowchart of an example method 500 of processing images from a mobile platform to detect road surface wetness that may be performed by control logic 456a of computer system 110 (hereinafter referred to as "computer 110").

At 505, computer 110 normalizes scene lighting in images (i.e., normalizes pixel intensities) across different scene lighting conditions. In an example, intensities of image pixels that do not fall within a predetermined intensity range may be adjusted to fall within that range. Also, an average pixel intensity for a given image may be calculated across all of the pixels and if the average pixel intensity is above or below a predetermined range, all of the pixel intensities may be decreased or increased by a predetermine amount to bring the average pixel intensity into the range.

At 510, computer 110 segments different scene features in the images to isolate/distinguish a road surface from other scene features.

At 515, computer 110 filters the isolated scene feature (road surface) in the images to extract statistical features (based on pixel intensities) indicative of changes in wetness of the road surface isolated at 510.

At 520, computer 110 classifies the extracted statistical features as either wet or dry road surface.

At 525, computer 110 report results, e.g., whether the road surface is wet or dry, based on the classify operation 520.

Any known or hereafter developed technique used to detect road surface wetness based on processing of images of a road surface may be used herein.

The weather-related or induced visibility-change detection algorithm performed by logic 456c is now described. Direct meteorological visibility measurement from camera imagery can be a difficult problem to solve. Camera-capture conditions such as exposure characteristics and viewing geometry (e.g., field of view, focal length, azimuth, and the like) add many degrees of freedom that may be impractical to measure/control. As such, true visibility estimates from uncontrolled camera sources, like those from traffic cameras, can be impractical. Changes in weather conditions, from clement to inclement states, often result in changes in atmospheric extinction and scattering. Measuring the effect that these changes have on images is a more tractable problem compared to that of direct meteorological visibility calculation. The weather-related visibility-change detection algorithm measures the impact that the changes in atmospherics have on the color of the captured images. During conditions of clement weather (brightly sunlit scene) the color information contained in the image is at its maximal position. As the atmospheric scattering/extinction increases, the color information in the image degrades and changes toward that of skylight. The visibility-change detection algorithm measures the impact that skylight had on the color information in a captured image. By comparing this metric for images captured at different times an estimate of the visibility change is achieved. Image compression (namely the chroma-compression component of JPEG compression) is a major source of uncertainty when trying to measure color changes in highly compressed imagery.

Figure 6:
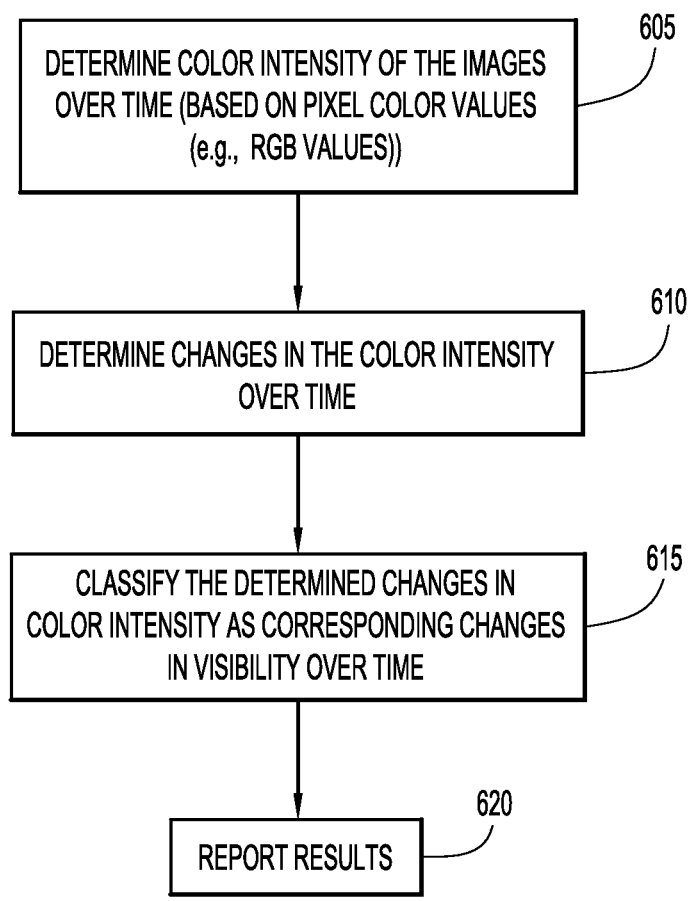
FIG. 6 is a flowchart of an example method of processing images captured by a mobile platform image sensor to detect weather-related changes in visibility.

With reference to FIG. 6, there is a flowchart of an example method 600 of processing images from a mobile platform to detect weather-related changes in visibility that may be performed by control logic 456c in computer 110.

At 605, computer 110 determines color intensity of the images over time (based on pixel color values (e.g., RGB values)). For example, average R, G, and B values are calculated across each image.

At 610, computer 110 determines changes in the color intensity over time, e.g., changes in the average R, G, and B values.

At 615, computer 110 classifies the determined changes in color intensity as corresponding weather-related changes in visibility. For example, a reduction in intensity below a first predetermined intensity threshold may be indicative of, and classified as, a reduction in visibility due to cloudiness. Conversely, an increase in intensity above a second predetermined intensity threshold may be indicative of, and classified as, an increase in visibility due to relatively clear-sky conditions.

At 620, computer 110 reports results output by operation 615.

Any known or hereafter developed technique used to detect weather-related changes in visibility based on processing of images of weather conditions may be used herein.

The precipitation detection algorithm is now described. Detecting the presence of precipitation, such as rain, in a sequence of images (or video) can be formalized as a signal-detection problem in the presence of clutter. In the example of rain, the presence of rain (the signal) manifests itself as pseudo-random spatiotemporal intensity fluctuations in the image pixels due to the optical disruption of the background illumination by the rain drops. The frequency and magnitude of these intensity fluctuations is proportional to the intensity of the rain. The presence of this rain signal, in an image, is dependent on the characteristics of the camera used to capture the image. Images that come from high resolution, low noise, and near lossless compression are the best candidates for this signal detection task.

The spatiotemporal fluctuations in the image that do not arise from the optical effects of rain drops are considered clutter. Sources of clutter come from both natural and artificial sources. Natural sources of clutter arise from moving objects in the image sequences, such as cars, moving tree limbs, shadows, clouds, and the like. Artificial sources of clutter include video compression artifacts and camera sensor noise. Preconditioning the images and segmenting them into foreground and background image components aids in the detection process. The rain signal is present in the foreground regions.

The spatiotemporal-spectral signature of the signal in rain image sequences is different from that of non-rain image sequences. Spatial and temporal filtering of the foreground sequences is used to isolate signals in bandpasses suited for detecting the presence, or absence, of the intensity fluctuations due to rain. Statistics (features) of bandpass-filtered signals are calculated and input into machine-learning algorithms that predict the state of the signal (i.e., rain or non-rain). As with the road-surface wetness detection algorithm, varied training data is used to create a robust classifier.

Figure 7:
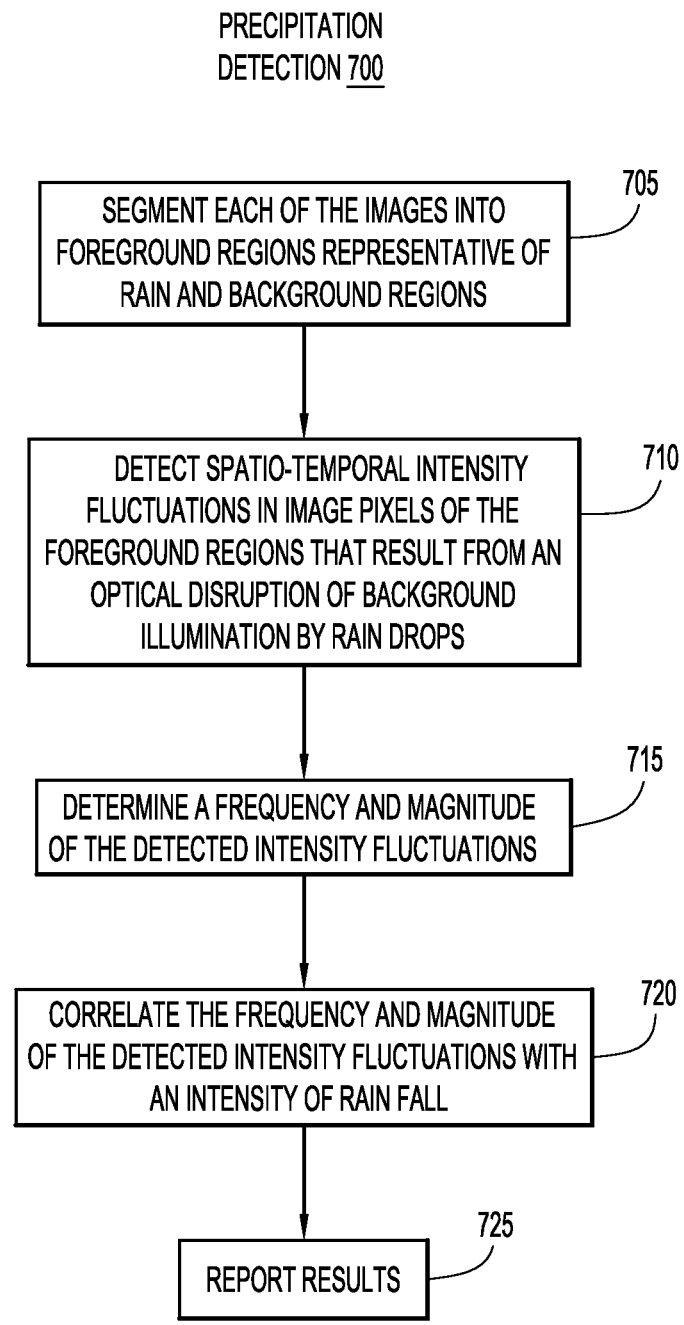
FIG. 7 is a flowchart of an example method of processing images captured by a mobile platform image sensor to detect precipitation.

With reference to FIG. 7, there is a flowchart of an example method 700 of processing images from a mobile platform to detect precipitation, e.g., rain, which may be performed by control logic 456b in computer system 110.

At 705, computer 110 segments images into foreground regions representative of rain and background regions.

At 710, computer 110 detects spatiotemporal pixel intensity fluctuations of the foreground regions that result from an optical disruption of background illumination by rain drops.

At 715, computer 110 determines a frequency and magnitude of the detected intensity fluctuations.

At 720, computer 110 correlates the frequency and magnitude of the detected intensity fluctuations with an intensity of rain fall.

At 725, computer 110 report results, e.g., whether it is raining.

Any known or hereafter developed technique used to detect precipitation based on processing of images of weather conditions may be used herein.

Figure 8:
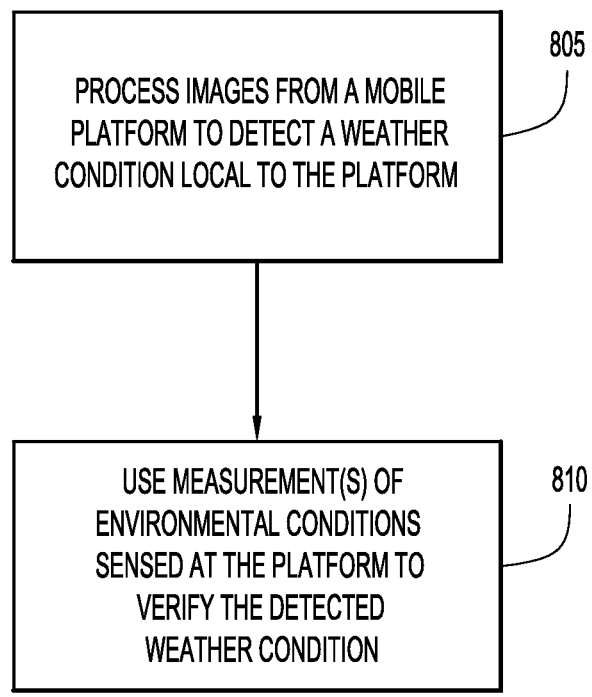
FIG. 8 is a flowchart of an example method of combining processing of images with environmental sensor measurements from a mobile platform to detect and/or verify weather conditions local to the mobile platform.

With reference to FIG. 8, there is a flowchart of an example method 800 of combining processing of images with environmental sensor measurements from mobile platform 104(1) to detect and/or verify weather conditions local to the mobile platform.

At 805, computer 110 processes images from one of mobile platforms 104 using a weather condition detection algorithm to detect a weather condition, e.g., whether it is raining.

At 810, computer 110 verifies the detected weather condition using measurements of environmental conditions sensed at mobile platform 104(1), e.g., temperature, atmospheric pressure, humidity, and/or dew point. For example, computer 110 compares the detected weather condition, e.g., rain detected, against a predetermined acceptable range for an environmental condition measurement, e.g., humidity greater than 85%, deemed consistent with the detected weather condition, and verifies the detected weather condition only if the environmental condition measurement is within the predetermined acceptable range.

Figure 9:
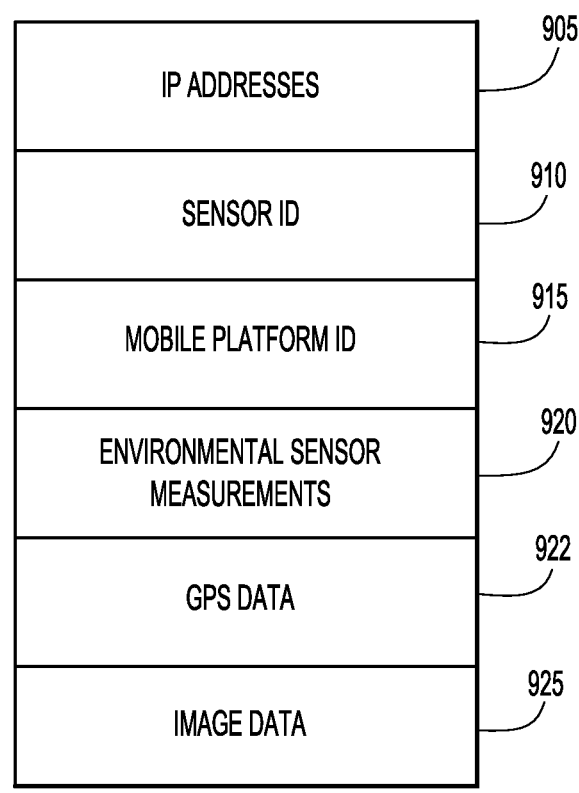
FIG. 9 is an illustration of an example data packet generated by the mobile platform and transmitted from the mobile platform to a control station over a network.

With reference to FIG. 9, there is an illustration of an example data packet 900 generated by mobile platform 104(1) and transmitted from the mobile platform to control station 108 over network 106. Data packet 900 includes Internet Protocol (IP) addresses 905 including a source IP address associated with mobile platform 104(1) and a destination IP address associated with control station 104(1). Data packet 900 also includes one or more unique sensor IDs 910 to identify the sensors (e.g., cameras 118(1), 118(2)) on mobile platform 104(1) that have captured information 920, 922, and 925 presented in the data packet, and a unique mobile platform ID to identify mobile platform 104(1). Data packet 900 also includes sensor data 920, 922, 925 captured by environmental sensors 120, GPS device 126, and cameras 118, respectively. Data packet 900 may also include one or more network IDs, e.g., local area network (LAN) IDs, wide area network (WAN) IDs, and/or sensor platform network IDs (not explicitly shown in FIG. 9) to identify networks to which mobile platform 104(1) and its sensors belong. Various ones of the above-mentioned IDs may be presented on displays 112 in association with results of the weather condition detections and the received images to identify the source of information used to generate the presentations.

Embodiments presented herein provide a coordinated ground-based persistent mobile/vehicle surveillance system for the detection, tracking and analysis of weather conditions/events using image or video sequences acquired from image sensors aboard moving platforms. Embodiments provide weather condition detection, verification, and validation based on information from moving platforms in combination with traditional environmental sensor measurements. The embodiments advantageously use both environmental sensor measurements and image observations made at the ground-level, and coordinate and aggregate image and environmental sensors aboard moving platforms into a homogenous network for weather condition/event tracking.

The embodiments may be used as a visualization system for monitoring/tracking severe storm warnings and radar data at a localized level and coordinating terrestrial camera networks to track selected storms. This provides a user with an ability to visualize a weather event from the ground from multiple vantage points. Embodiments may be used for verification of weather events, by visualizing and exploiting captured video/still imagery and display of real-time video/ still imagery for dissemination of relevant ground conditions. Embodiments enable users to visually observe weather condition/events in real-time as a critical aspect providing validation to atmospheric models and forecasts. The capability to detect weather phenomena such as rain, snow, and hail using ground based cameras on vehicles provides a significant and relevant means of extracting hyper-local weather conditions.

In summary, in one form, a method of detecting weather conditions using images from a mobile platform is provided, comprising: at a control station: receiving from a communication network data packets transmitted wirelessly to the network by a mobile platform separated from the control station, the data packets carrying images captured by an image sensor aboard the mobile platform and that show one or more weather conditions local to the mobile platform; recovering the images from the data packets; processing the images according to one or more weather condition detection algorithms to detect the one or more weather conditions, respectively; and reporting the one or more detected weather conditions.

In another form, an apparatus is provided comprising: a network interface unit (NIU) to send and receive data packets to and from a communication network; and a processor coupled to the NIU and configured to: receive from a communication network data packets transmitted wirelessly to the network by a mobile platform separated from the apparatus, the data packets carrying images captured by an image sensor aboard the mobile platform and that show one or more weather conditions local to the mobile platform; recover the images from the data packets; process the images according to one or more weather condition detection algorithms to detect the one or more weather conditions, respectively; and report the one or more detected weather conditions.

In yet another form, a system is provided comprising: multiple mobile platforms each respectively equipped with: an image sensor to capture images that show weather conditions local to the mobile platform; a mobile platform processor to packetize the images into data packets; and a wireless transmitter to wirelessly transmit the data packets to a communication network; and a control station to: receive from the communication network the data packets transmitted thereto by the mobile platforms; recover from the data packets the images from each of the image sensors and process the images according to one or more weather condition detection algorithms to detect the one or more weather conditions local to each of the mobile platforms, respectively; and generate for display the images from each mobile platform and corresponding reports of detected weather conditions output by the weather condition detection algorithms.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, method, and computer program product as set forth in the following claims.

What is claimed is:

1. A method of detecting weather conditions using images from a mobile platform, comprising:
at a control station: receiving from a communication network data packets transmitted wirelessly to the network by a mobile platform separated from the control station, the data packets carrying images captured by an image sensor aboard the mobile platform and that show one or more weather conditions local to the mobile platform;

recovering the images from the data packets;

processing the images according to one or more weather condition detection algorithms to detect the one or more weather conditions, respectively, including processing to detect whether rain is present by:

segmenting the images into foreground regions representative of rain and background regions;

bandpass filtering the foreground regions spatially and temporally;

detecting spatiotemporal intensity fluctuations in the bandpass filtered foreground regions that result from an optical disruption of background illumination by rain drops;

determining a frequency and magnitude of the detected intensity fluctuations; and correlating the frequency and magnitude of the detected intensity fluctuations with an intensity of rain fall; and reporting the one or more detected weather conditions.

2. The method of claim 1, further comprising, at the control station:

displaying the images and the reported one or more detected weather conditions.

3. The method of claim 1, wherein the processing the images includes processing intensity values of image pixels of the images according to the one or more weather condition detection algorithms.

4. The method of claim 1, wherein:

the images include images of a road surface over which the mobile platform travels; and the processing includes processing to detect whether the road surface is wet or dry.

5. The method of claim 4, wherein the processing to detect whether the road surface is wet or dry includes:

normalizing scene lighting in images across different scene lighting conditions;

segmenting scene features in images to isolate the road surface from other scene features in the images;

extracting statistical features indicative of changes in road wetness conditions of the road surface; and classifying the statistical features as either wet or dry road surface conditions.

6. The method of claim 1, wherein the processing includes processing to detect weather-related changes in visibility.

7. The method of claim 1, further comprising, at the mobile platform:

capturing the images that show the one or more weather conditions with the image sensor aboard the mobile platform; and wirelessly transmitting the images in the data packets from the mobile platform to the communication network.

8. The method of claim 7, further comprising, at the mobile platform:

prior to the wirelessly transmitting, preprocessing the images by:

stabilizing the images to compensate for scene motion introduced by motion of the mobile platform; and compressing the images, wherein the wirelessly transmitting includes wirelessly transmitting the images in a stabilized, image compressed form in the data packets.

9. The method of claim 8, wherein the preprocessing further includes filtering the images to remove images that are unsuitable for being processed according to the one or more weather condition detection algorithms used to detect the weather conditions.

10. The method of claim 7, wherein:

the image sensor is positioned on the mobile platform and configured so that a field of view of the image sensor encompasses a scene of a road surface on which the mobile platform travels, a horizon toward or away from which the mobile platform travels, and a portion of sky; and the capturing images includes capturing images of the scene of the road surface, the horizon, and the portion of the sky.

11. The method of claim 1, further comprising, at the control station:

receiving from the communication network measurements of environmental conditions obtained by corresponding environmental sensors aboard the mobile platform and wirelessly transmitted to the network by the mobile platform, the measurements including measurements of one or more of temperature, humidity, atmospheric pressure, and dew point; and verifying the one or more detected weather conditions based on the environmental measurements.

12. A apparatus comprising:

a network interface unit (NIU) to send and receive data packets to and from a communication network; and a processor coupled to the NIU and configured to:

receive from a communication network data packets transmitted wirelessly to the network by a mobile platform separated from the apparatus, the data packets carrying images captured by an image sensor aboard the mobile platform and that show one or more weather conditions local to the mobile platform;

recover the images from the data packets;

process the images according to one or more weather condition detection algorithms to detect the one or more weather conditions, respectively, including to detect whether rain is present by:

segmenting the images into foreground regions representative of rain and background regions;

bandpass filtering the foreground regions spatially and temporally;

detecting spatiotemporal intensity fluctuations in the bandpass filtered foreground regions that result from an optical disruption of background illumination by rain drops;

determining a frequency and magnitude of the detected intensity fluctuations; and correlating the frequency and magnitude of the detected intensity fluctuations with an intensity of rain fall; and report the one or more detected weather conditions.

13. The apparatus of claim 12, wherein the processor is further configured to:

generate for display the images and the reported one or more detected weather conditions.

14. The apparatus of claim 12, wherein the processor is configured to process the images by processing intensity values of image pixels of the images according to the one or more weather condition detection algorithms.

15. The apparatus of claim 14, wherein the processor is configured to process the images by processing the images according to the one or more weather condition detection algorithms to detect one or more of whether a road surface on which the mobile platform travels is wet or dry, weather-related changes in visibility, and whether rain is present.

16. The apparatus of claim 12, wherein the processor is further configured to:
receive from the communication network measurements of environmental conditions obtained by corresponding environmental sensors aboard the mobile platform and wirelessly transmitted to the network by the mobile platform, the measurements including measurements of one or more of temperature, humidity, and atmospheric pressure; and
verify the one or more detected weather conditions based on the environmental measurements.

17. The apparatus of claim 12, wherein the images are one of visible light images and infrared images.

18. A system comprising:
multiple mobile platforms each respectively equipped with:
an image sensor to capture images that show weather conditions local to the mobile platform;
a mobile platform processor to packetize the images into data packets; and
a wireless transmitter to wirelessly transmit the data packets to a communication network; and
a control station to:
receive from the communication network the data packets transmitted thereto by the mobile platforms;
recover from the data packets the images from each of the image sensors and process the images according to one or more weather condition detection algorithms to detect the one or more weather conditions local to each of the mobile platforms, respectively, including to detect whether rain is present by:
segmenting the images into foreground regions representative of rain and background regions;
bandpass filtering the foreground regions spatially and temporally;
detecting spatiotemporal intensity fluctuations in the bandpass filtered foreground regions that result from an optical disruption of background illumination by rain drops;
determining a frequency and magnitude of the detected intensity fluctuations; and
correlating the frequency and magnitude of the detected intensity fluctuations with an intensity of rain fall; and
generate for display the images from each mobile platform and corresponding reports of detected weather conditions output by the weather condition detection algorithms.

19. The system of claim 18, wherein the multiple image sensors of the multiple mobile platforms include video cameras mounted to the mobile platforms.

20. The system of claim 18, wherein:
the mobile platform processor is further configured to preprocess the images by:
stabilizing the images to compensate for scene motion introduced by motion of the mobile platform; and
compressing the images; and
the wireless transmitter is configured to wirelessly transmit the images in the data packets in a stabilized, image compressed form.

21. The system of claim 18, wherein the station processor is configured to process the received images by processing intensity values of image pixels of the received images according to the one or more weather condition detection algorithms.

* * * * *